(No Model.)  3 Sheets—Sheet 1.
T. SANDERS.
CAR BRAKE AND STARTER.
No. 366,430.  Patented July 12, 1887.
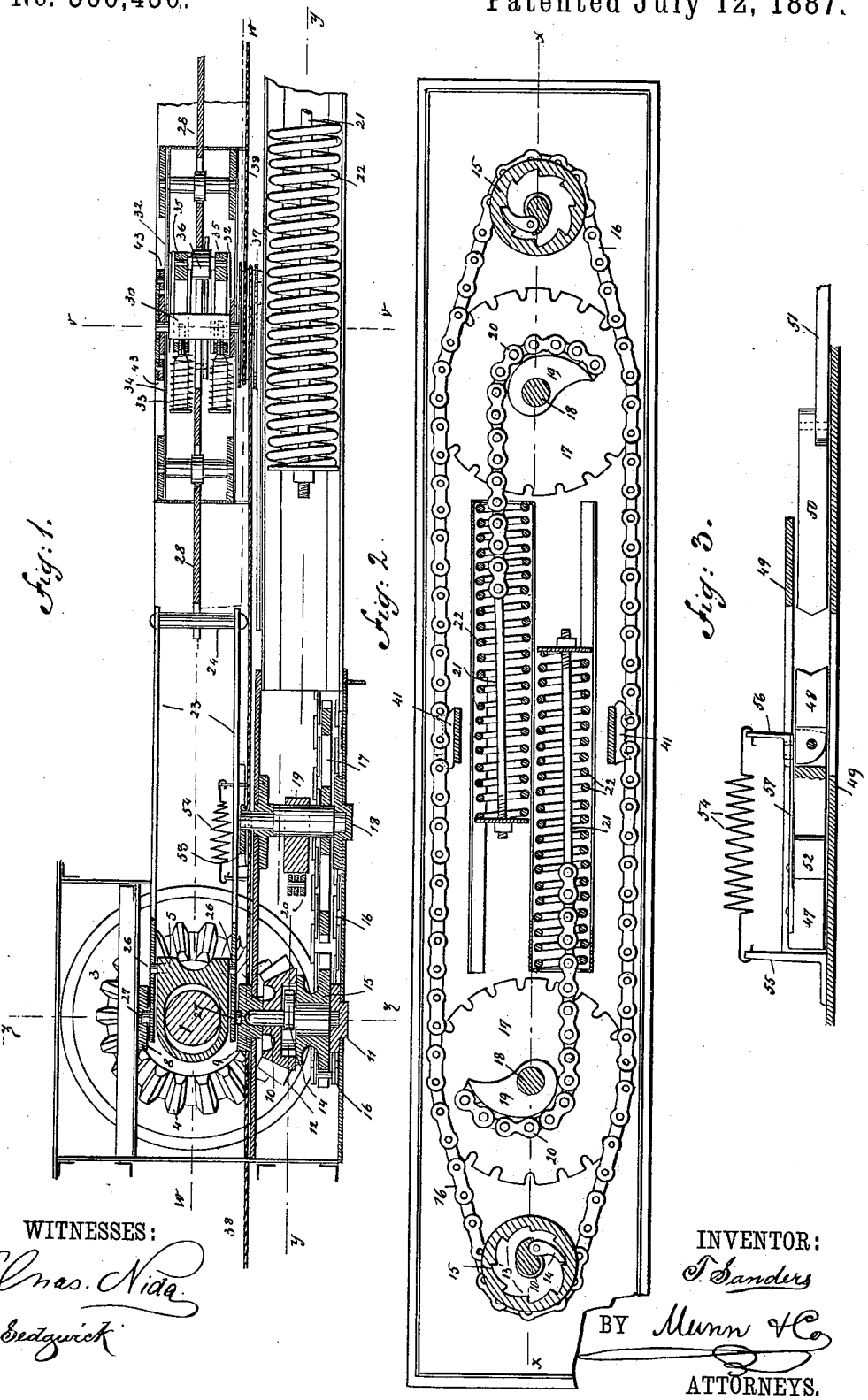
WITNESSES:
Chas. Nida
C. Sedgwick
INVENTOR:
T. Sanders
BY Munn & Co.
ATTORNEYS.

(No Model.) 3 Sheets—Sheet 2.
T. SANDERS.
CAR BRAKE AND STARTER.
No. 366,430. Patented July 12, 1887.
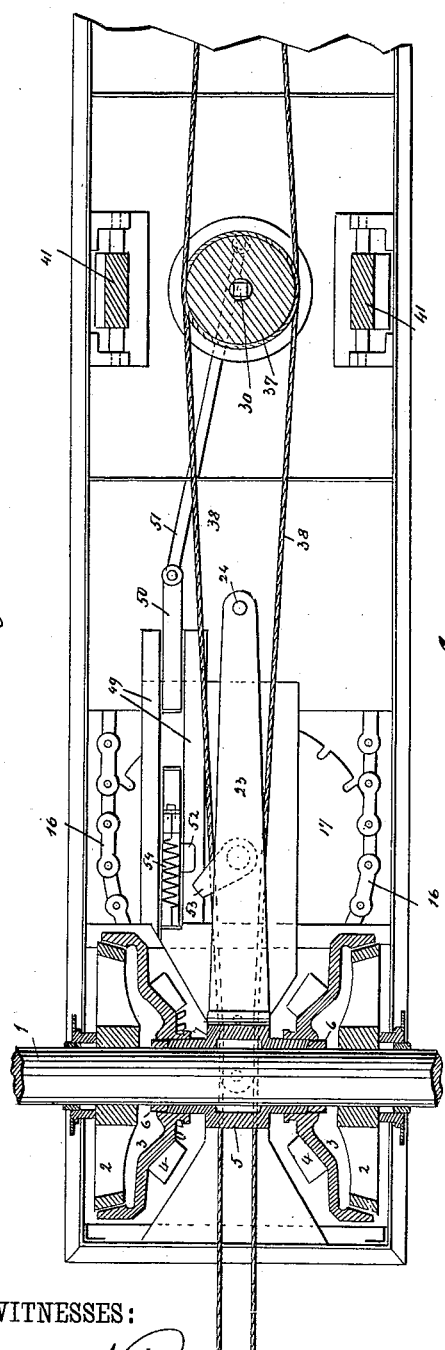
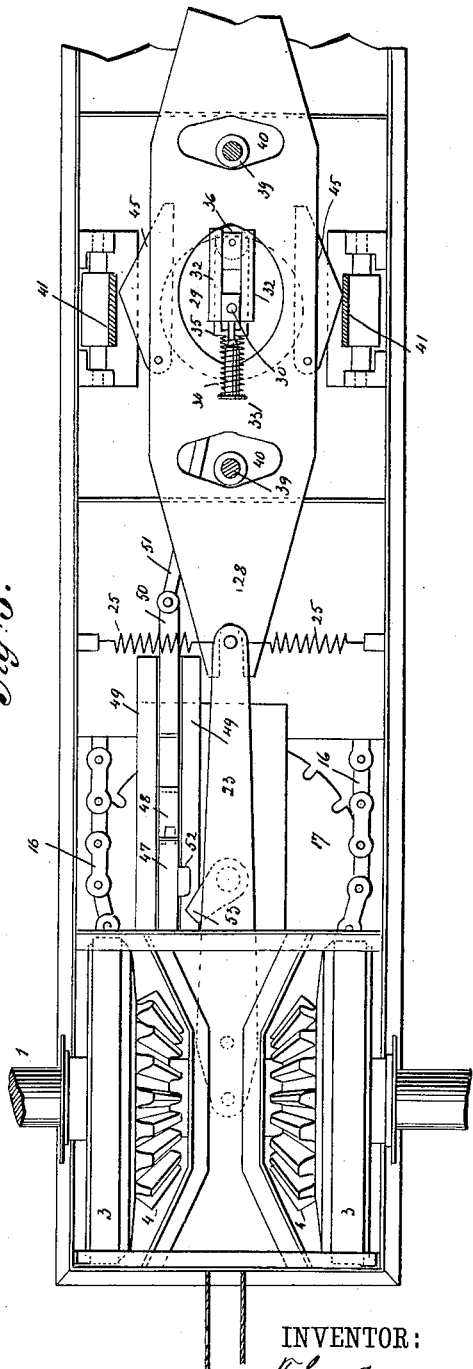
WITNESSES:
INVENTOR:
T. Sanders
BY Munn & Co.
ATTORNEYS.

(No Model.) 3 Sheets—Sheet 3.
T. SANDERS.
CAR BRAKE AND STARTER.
No. 366,430. Patented July 12, 1887.
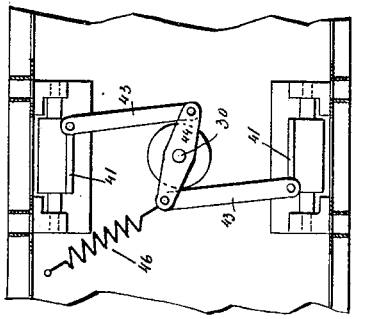
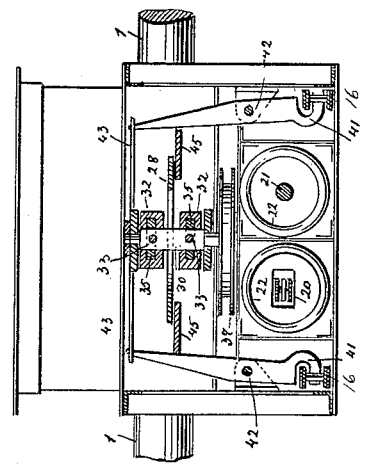
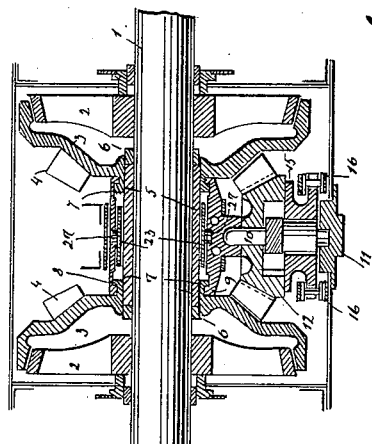
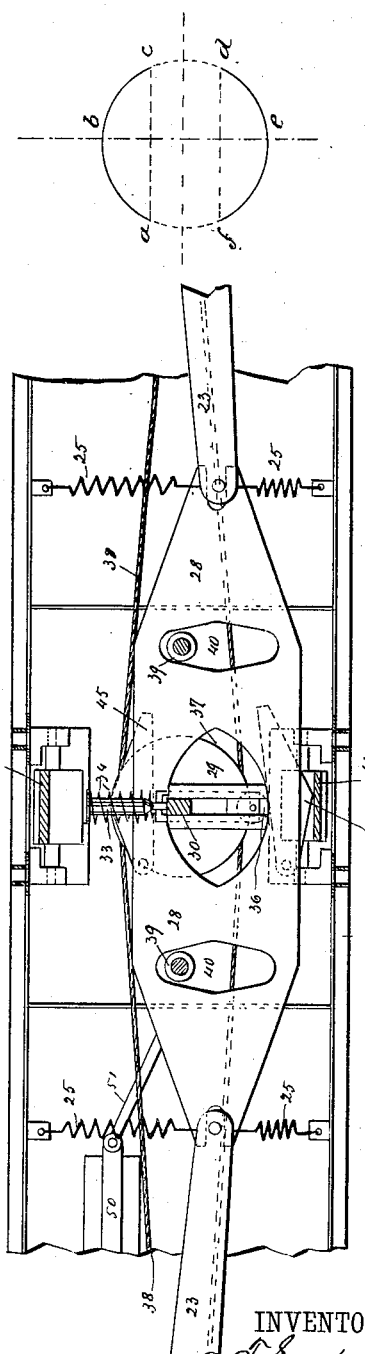
WITNESSES:
Chas. Nida
C. Sedgwick
INVENTOR:
T. Sanders
BY Munn & Co.
ATTORNEYS.

UNITED STATES PATENT OFFICE.

THEODOR SANDERS, OF AMSTERDAM, NETHERLANDS.

CAR BRAKE AND STARTER.

SPECIFICATION forming part of Letters Patent No. 366,430, dated July 12, 1887.

Application filed February 26, 1887. Serial No. 228,968. (No model.)

*To all whom it may concern:*

Be it known that I, THEODOR SANDERS, a citizen of the Kingdom of the Netherlands, residing in Amsterdam, Province of Holland, have invented certain new and useful Improvements in a Combined Car Brake and Starter, of which the following is a full, clear, and exact description.

The invention relates to the class of car brakes and starters wherein the energy or force expended in applying the brake is stored by accumulator-springs, and which stored energy may be employed to start the car, the object of my invention being to improve the construction of car brakes and starters of this character.

The invention consists in the mechanism substantially as hereinafter described and claimed.

Reference is to be had to the accompanying drawings, forming a part of this specification, in which similar figures of reference indicate corresponding parts in all the views.

Figure 1 is a broken longitudinal sectional elevation on line $x\ x$ of Fig. 2. Fig. 2 is a horizontal section on the line $y\ y$ of Fig. 1. Fig. 3 is a detail view of devices for automatically relieving the pressure on the brake when the accumulator-springs are fully compressed. Fig. 4 is a broken horizontal section on line $w\ w$ in Fig. 1. Fig. 5 is a broken plan view of my improved mechanism, parts being removed. Fig. 6 is a plan view, partly in section, of the brake-lever-operating plate and its appurtenances. Fig. 7 is a plan view of the arrangement of levers for locking the endless chain. Fig. 8 is a vertical cross-section on line $z\ z$ of Fig. 1. Fig. 9 is a vertical cross-section on line $v\ v$ of Fig. 1, and Fig. 10 is a diagram showing the line of travel of the friction-roller that actuates the brake-lever operating plate.

As the brake mechanism at both ends of the car is alike, it will suffice here to particularly describe the mechanism at one end only.

On the car-axle 1 two friction-wheels, 2, are fixedly secured, and are beveled on their peripheral edges. Loosely on said axle, inward from the friction-wheels 2, are mounted two wheels, 3, each of which is adapted to be thrown into frictional contact with the beveled peripheral edge of the adjacent friction-wheel 2, and each is provided on the back or inner surface thereof with bevel-gear teeth 4. Between the loose wheels 3 the axle is fitted with a loose sleeve or barrel, 5, that extends into the hubs of said loose wheels, its ends abutting collars 6, fixedly secured to said axle. The hubs of the wheels 3 on the inside are made with annular flanges 7 to form grooves in said hubs, and into these grooves extend the ribbed ends of locking plates or blocks 8 9, that connect the two wheels 3 3 together, but not interfering with the free rotation of said wheels independent of said plates 8 9. The block or plate 8 connects the wheels 3 3 above the sleeve 5, and the block 9 performing a like office below the sleeve 5. The block 9 also forms a bearing for the upper end of a vertical axle, 10, the lower end of said axle being journaled in a bearing-block, 11, secured to the frame-work of the apparatus. The vertical axle 10 carries a bevel gear-wheel, 12, that meshes into the teeth of the loose wheels 3 3 on the car-axle, and is recessed in its bottom side, the walls of said recess being formed with teeth 13, with which engages a dog, 14, eccentrically secured to the vertical axle 10 within said recess.

On the vertical axle 10, below the gear-wheel 12, is keyed a chain-wheel, 15, for the endless chain 16, that extends to and around a like chain-wheel, 15, at the other end of the car, and over larger intermediate chain-wheels, 17. On the axles 18, that carry the chain-wheels 17, are keyed cams 19, to the extreme outer ends of which are secured short chains 20, the other ends of which chains are connected with the ends of rods 21, that are surrounded by strong accumulator-springs 22.

The loose wheels 3 are thrown into and out of contact with the friction-wheels 2 by means of levers 23 23, connected at one end by a connecting-bar, 24, and a plate, 28, connects the connecting-bars 24 of the two sets of levers 23 with which the apparatus is provided, which plate 28 is made to operate the levers in a manner hereinafter to be described.

As one of the loose wheels 3 is thrown into frictional contact with one of the friction-wheels 2, the bevel gear-wheel 12 is caused to revolve, and the internal teeth, 13, of said gear-wheel engage the eccentric dog 14 on the vertical axle 10, revolving said vertical axle, and with it the chain-wheel 15 and the endless chain 16. As the chain-wheels 17 are turned by the endless chain 16, the chains 20 are wound in by the cams 19, drawing on the rods 21 and compressing the accumulator-springs 22. When the springs 22 are allowed to expand, the chain-wheels 17 are turned by the rods 21, drawing on the chains 20, and the endless chain 16 is caused to travel, rotating the chain-wheel 15 on the vertical axle 10. As the axle 10 is rotated by the chain-wheel 15, the eccentric dog 14 on said axle engages the internal teeth, 13, of the bevel gear-wheel 12, turning said gear-wheel, and with it the loose wheels 3, one of the friction-wheels 2, and thereby the car-axle 1, and the car is thus started.

It will be seen that in the action of applying the brake and compressing the accumulator-springs the gear-wheel 12 rotates the vertical axle 10 by means of the teeth 13 and dog 14; but in the action of starting the car the reverse of this takes place—namely, the gear-wheel 12 is rotated by the vertical axle, this being effected by the eccentric adjustment of the dog 14 on axle 10.

The brake-operating levers 23 extend, respectively, above and below the barrel 5, between said barrel and the locking-plates 8 and 9, and are fulcrumed on studs or pins 26 26, projecting from the sleeve or barrel 5 into corresponding holes in said levers. The extreme forward or outer ends of the levers 23 are formed on the outer surfaces with studs or projections 27, that enter corresponding recesses in the locking-plates 8 9, respectively.

The plate 28, that connects the two sets of levers 23, is formed with a central opening, 29, the defining edges of said opening having the form of segments of a circle eccentric to the center of said opening.

A squared vertical axle or shaft, 30, is journaled in the frame-work of the apparatus above and below the plate 28, passing through the eccentric opening 29 thereof, and carries a frame, 32. In the squared axle 3 are secured headed rods or bolts 33, one above and one below the plate 28, that are surrounded by spiral springs 34, that bear, respectively, against the upper and lower members of a frame, 35, fitted yieldingly in the frame 32, and which frame 35 forms at its other end bearings for a friction-roller, 36. The springs 34 cause the friction-roller 36 to bear against the plate 28 on the defining edges of the central eccentric opening, 29. On the lower end of the axle 30 is keyed a peripherally-grooved wheel, 37, around which pass the ropes or chains 38, that extend from end to end of the car to the lower ends of the usual brake-shafts, (not shown,) through holes in the blocks 9, hereinbefore described.

As the ropes or chains 38 are wound in by the turning of the brake-shaft by the brakeman, the wheel 37 is turned, and with it the axle 30 and the frames 32 and 35. As the said axle and frames rotate, the springs 34, exerting a constant pressure on the rear end of the yielding frame 35, the roller 36 in said frame will press against plate 28 and force it sidewise, carrying with it the inner ends of the brake-operating levers 23, turning the said levers on their fulcrums 26, and throwing one of the loose wheels 3 on each axle into frictional contact with the adjacent friction-wheel 2, whereby the accumulator-springs 22 will be compressed in the manner previously explained. Springs 25 act to aid the return of the levers 23 to their normal position.

Guide-rollers 39, working in slots 40 in plate 28, serve to guide the said plate in its movements. The plate 28 has a slight forward and backward movement, in addition to the sidewise movement just described, by reason of its loose connection with the connecting-bars 24 of levers 23.

Although the friction-roller 36 can describe a full circle, $a\ b\ c\ d\ e\ f$, Fig. 10, the throw of the levers 23 by the movement of the plate 28 in response to the pressure of the said friction-roller is not measured by the distance traveled by said roller—that is to say, that while the roller 36 is traveling the distance, say from its normal position between the points $c$ and $d$ to the point $e$, the movement of the ends of the levers 23 will correspond to half the distance from $c$ to $d$ only, which in practice will be the play required by said levers to throw the brake mechanism into and out of gear.

The direction of movement of the plate 28 and levers 23 will be from right to left or left to right, according to the direction in which the car is traveling.

In order that the accumulator-springs may not act untimely, I have provided the locking-hooks 41, one for each side of the endless chain 16, the said hooks being pivoted, as at 42, and connected at their upper ends with links 43 43, the other ends of said links being connected with the opposite ends of a lever, 44, pivoted centrally on the upper end of axle 30. Triangularly-shaped blocks or plates 45 are pivotally secured to under side of the plate 28, opposite the hooks 41, above the pivots of said hooks, and lying in the path of travel of the roller 36.

The hooks 41 are normally pressed into the links of the chain 16 by means of a spring, 46, secured to one end of the lever 44. As long, therefore, as the plate 28 and friction-roller 36 are in the position shown in Fig. 5, (the brake out of work,) the chain 16 cannot move; but as the plate 28 moves toward either of the hooks 41 and the roller travels around to, say, the position shown in Fig. 6, (the apparatus at work either as brake or starter,) the friction-roller strikes the inner edge of one of the blocks or plates 45 and presses the same outward against the hook 41 above the pivot thereof, thereby withdrawing the hooks from the endless chain 16 and allowing said chain to travel.

If when the accumulator-springs are compressed to the fullest extent the car-axles should continue to rotate, and under the full pressure of the levers 23, it would result in great wear and very probably in the breakage of some parts of the apparatus. With the object of relieving the pressure of the loose wheels 3 on the friction-wheels 2 when the accumulator-springs are fully compressed, I provide the sliding blocks 47 48, working in guides 49, (shown best in Figs. 3, 4, and 5,) the block 48 being held in said guides by pivots on either side of said block. In the guides 49, in front of the block 48, is a sliding bar or arm, 50, which is connected with a connecting-rod, 51, the other end of said connecting-rod being eccentrically secured to the wheel 37. On the inner side of the block 47 is formed or to it is attached a lug, 52, adapted to be engaged by a trip, 53, that is fixedly secured on the end of the axle 18 of the chain-wheel 17, the said trip being so disposed that as the accumulator springs are compressed almost to the fullest extent, the trip will engage the lug 52 of block 47, forcing the said block and the block 48 forward, and with them the arm or bar 50, which bar 50 will have been previously forced inward against the block 48 by the turning of the wheel 37 in the action of applying the brake. As the arm 50 is forced outward by the movement of block 48, it causes the connecting-rod 51 to turn back the wheel 37, and also the axle 30 and friction-roller 36, which will lessen the leverage on the brake-operating levers 23 to an extent sufficient to lessen the friction between the wheels 2 and 3 and prevent breakage, but not sufficient to prevent the wheels 3 from acting as a brake on the friction-wheels 2.

When it is desired to start the car and the full pressure is again required on the levers 23, the peripherally-grooved wheel 37 and friction-roller 36 are brought back to the position they occupied before having been moved by the connecting-rod 51. This cannot be done, however, until the arm 50 can again move back in the direction of the block 48, and this it will be free to do as soon as the pressure on the block 48 from the block 47 has ceased, when the former will swing on its pivots to assume a substantially vertical position. A spiral spring, 54, is secured at one end to a post or standard, 55, Fig. 3, on the frame-work, and at the other end to a standard, 56, projecting from a plate-spring, 57, on the upper face of block 47, and which plate-spring extends partly over the block 48. As the block 47 is moved forward by trip 53, the spiral spring 54 will raise the end of the plate-spring 57, which will allow the block 48 to swing downward on its pivots. When the axle 18 rotates in response to the expansion of the accumulator-springs, the trip 53 will be removed from the lug 52, and when the car has been started and the wheel 37 brought to its normal position the connecting-rod 51 will have drawn the arm 50 away from block 48, so that the springs 54 57 may return the blocks 47 48 to their normal position.

While the arrangement and construction of the gearing and chain-wheels are the style preferred, it will be understood that I do not limit myself in this respect, for it is very evident that various means may be employed to compress the accumulator-springs.

Having thus fully described my invention, I claim as new and desire to secure by Letters Patent—

1. The combination, with the car-axles, fixed wheels 2 and loose wheels 3 on said axle, vertical axles 10, gear-wheels 12, and chain-wheels 15 on said vertical axles, of the endless chain 17, accumulator-springs 22, rods 21 for compressing said springs, chains 20, connecting the rods 21 with the chain-wheels 17, and levers for throwing the wheels on the axle into and out of gear, all substantially as shown and described.

2. The combination, with the car-axles, accumulator-springs, and intermediate gear for compressing said springs from said axle, of levers for throwing said gear into and out of action, a plate, 28, connecting the levers of both ends of the car, and formed with an eccentric opening, 29, a shaft, 30, carrying roller 36 and wheel 37, and the ropes or chains 38, passing around said wheel 37 from the brake-shafts, substantially as shown and described.

3. The combination, with the car-axle and accumulator-springs, of an endless chain and chain-wheels operating from said axle to compress said springs, the hooks 41 for locking said chain, levers 43 for operating said hooks, and a link, 44, connecting the two levers 43, substantially as shown and described.

4. The combination, with the car-axle, accumulator-springs, and intermediate gear for compressing said springs from said axle, of levers for throwing the said gear into and out of action, an eccentrically-slotted plate for throwing said levers, means, substantially as described, for actuating said plate, automatically-operating devices consisting of the blocks 47 48, the arm 50, and connecting-rod 51, adapted to be tripped to relieve the pressure on the accumulator-springs when the same are fully compressed, substantially as shown and described.

5. The combination, with the car-axles, accumulator-springs, and intermediate gear for compressing said springs from said axle, levers for throwing said gear into and out of action, a plate, 28, connecting the levers of each end of the car, and formed with a central eccentric opening, of a shaft or axle, 30, rotating in said opening, a frame thereon carrying friction-roller 36, and a peripherally-grooved wheel, 37, also on said axle 30, and around which the ropes 38 from the brake-shafts pass, substantially as shown and described.

6. The combination, with the car-axles, accumulator-springs, and an endless chain and chain-wheels operating from said axles to compress said springs, of levers for throwing said gear into and out of action, a plate, 28, connecting the levers of each end of the car and formed with a central eccentric opening, 29, a shaft or axle, 30, in said opening, a frame on said shaft carrying a friction-roller, 36, a peripherally-grooved wheel, 37, also on said axle 30, and around which ropes passing from the brake-shafts are wound, hooks 41 for locking the endless chain, a system of levers, 43 44, for engaging the hooks 41 with the endless chain, and blocks or plates 45, operated by the roller 36 to release said hooks, substantially as shown and described.

7. The combination, with the car-axles, accumulator-springs, and an endless chain and chain-wheels for compressing said springs from said axles, of the brake-operating levers 23, a plate, 28, connecting said levers, a shaft, 30, rotating in said opening and carrying roller 36 and wheel 37, the block 47 48, arm 50 and connecting-rod 51, secured to arm 50 and to wheel 37, and a trip on the axle of one of the chain-wheels for moving the blocks 47 48 and arm 50, to cause the connecting-rod 51 to slightly turn back the wheel 37 and roller 36, substantially as shown and described.

T. SANDERS.

Witnesses:
 AUGUST SIEGFRIED DOCA,
 WILHM. KABA.